Figure 1:
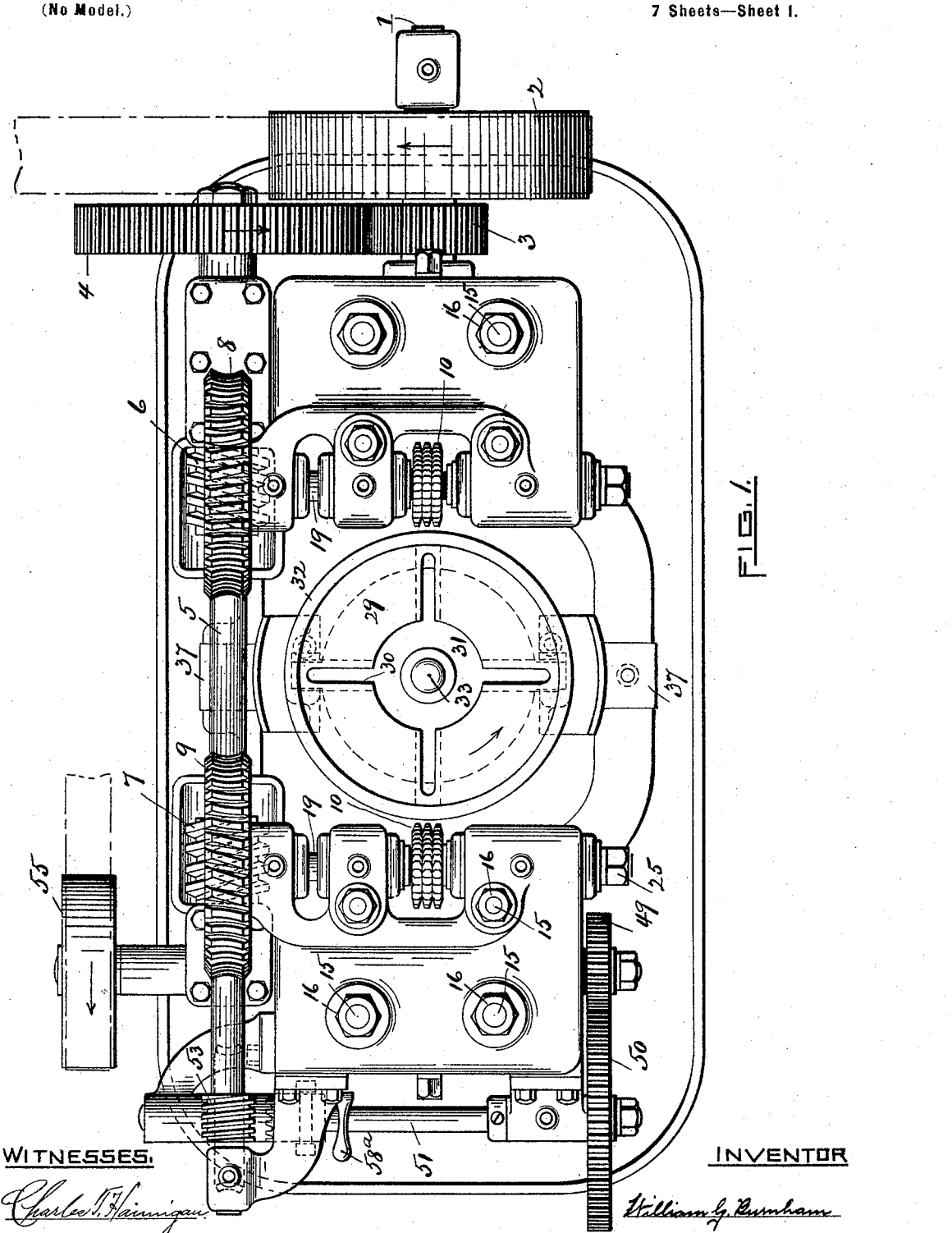

No. 607,982. Patented July 26, 1898.
W. G. BURNHAM.
GEAR CUTTING MACHINE.
(Application filed Apr. 20, 1896.)

(No Model.)  7 Sheets—Sheet 1.

WITNESSES:  INVENTOR

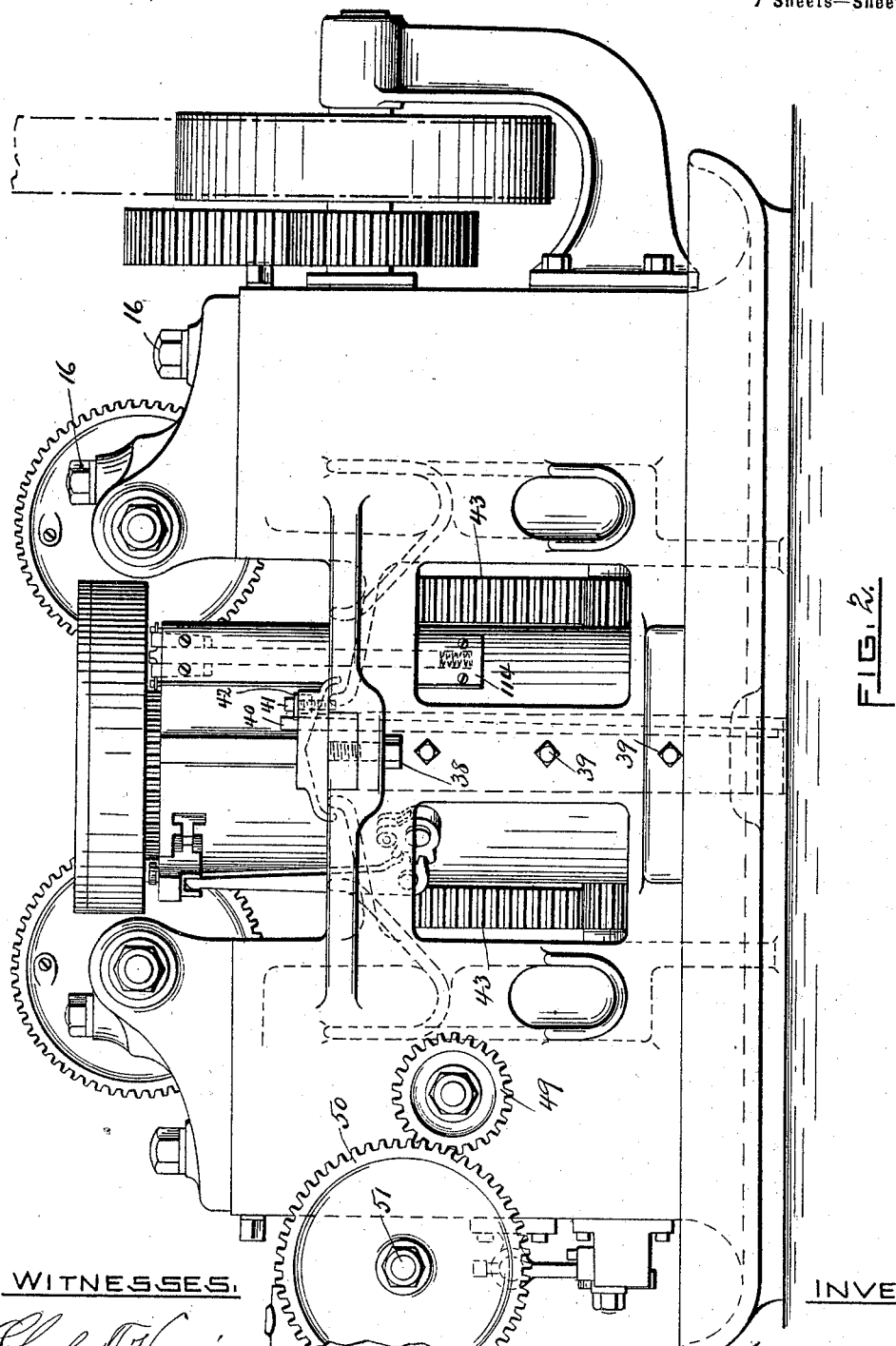

No. 607,982. Patented July 26, 1898.
W. G. BURNHAM.
GEAR CUTTING MACHINE.
(Application filed Apr. 20, 1896.)
(No Model.) 7 Sheets—Sheet 3.
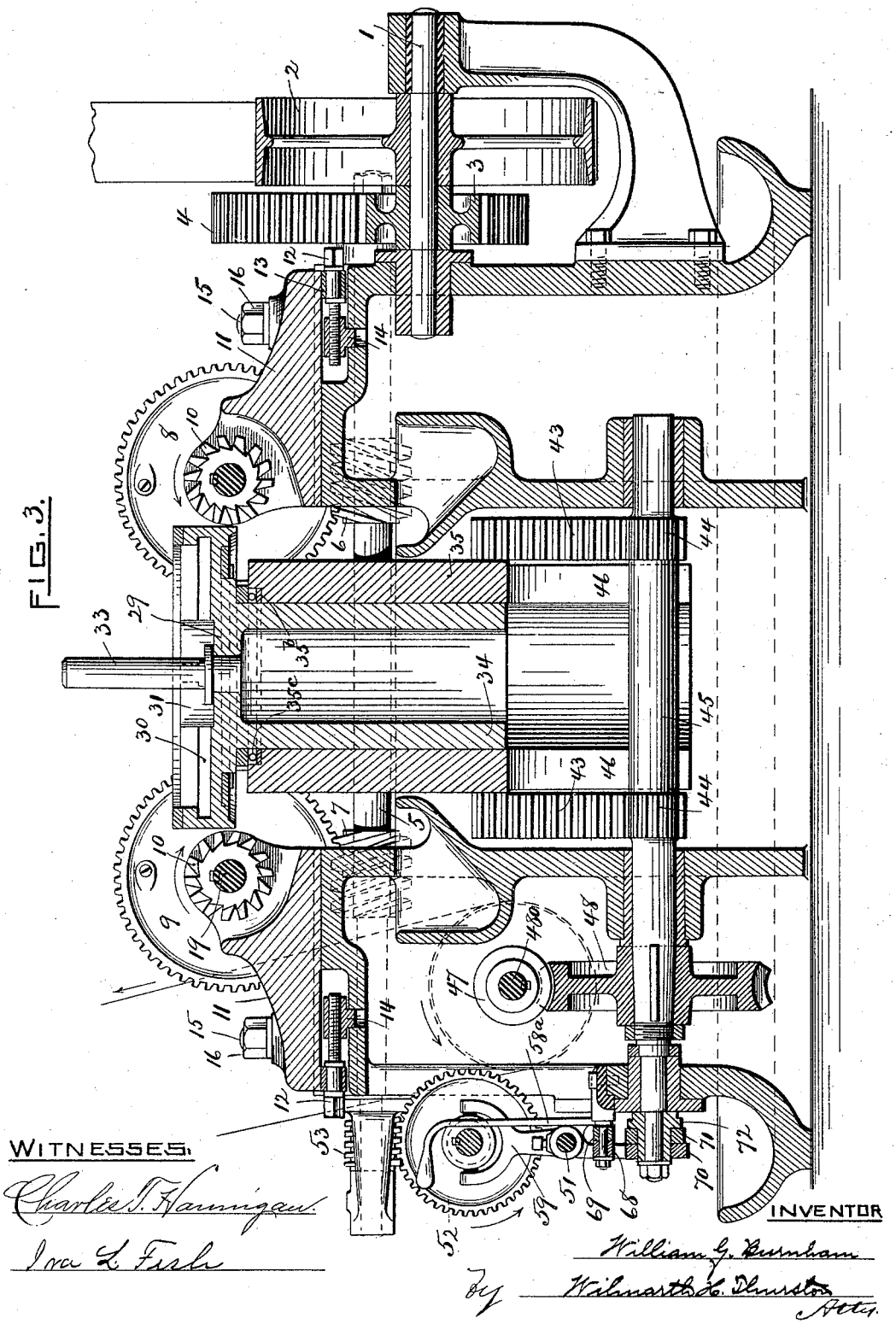
WITNESSES:
Charles T. Hannigan
Ira L. Fish
INVENTOR
William G. Burnham
by Wilmarth H. Thurston
Atty.

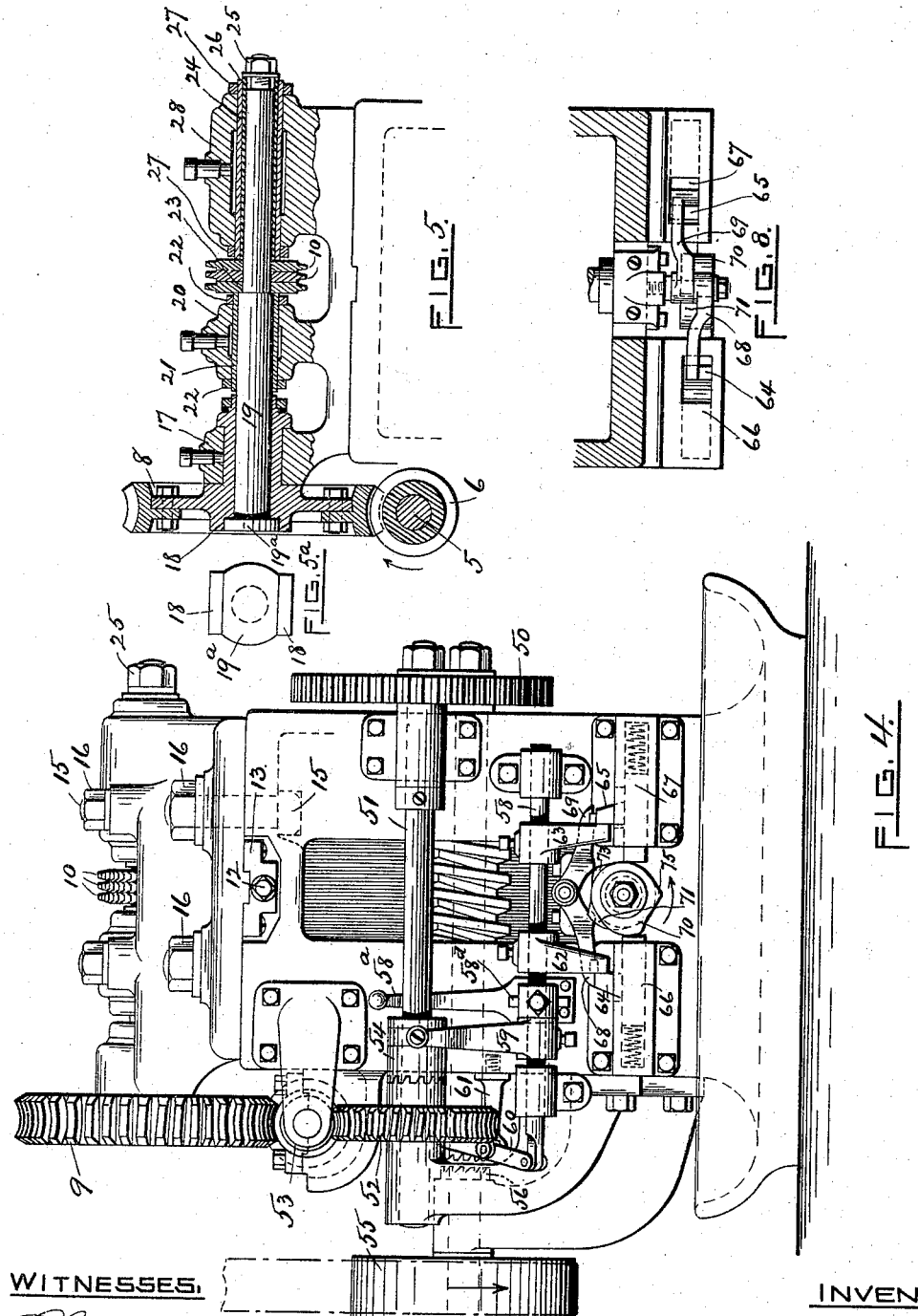

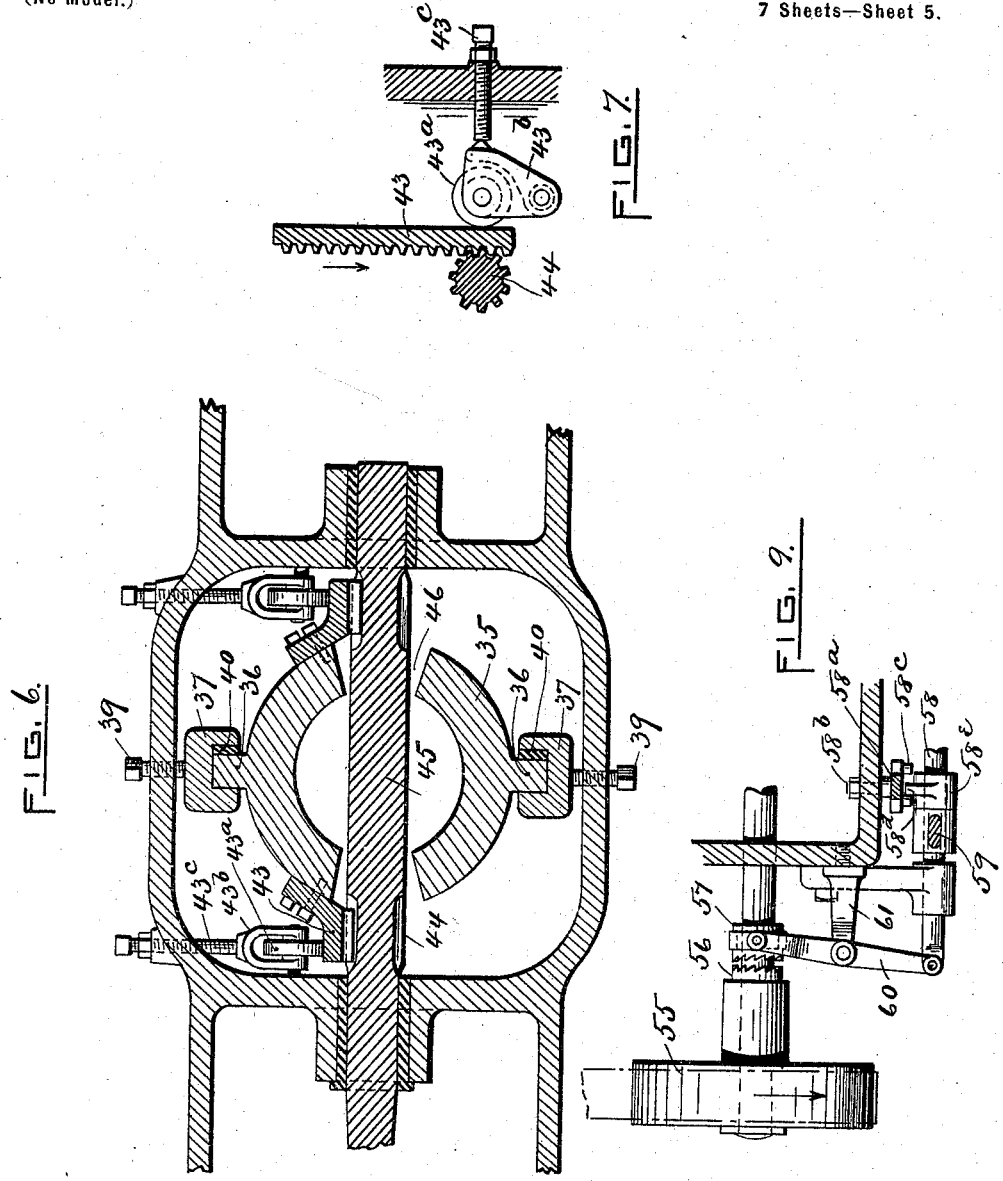

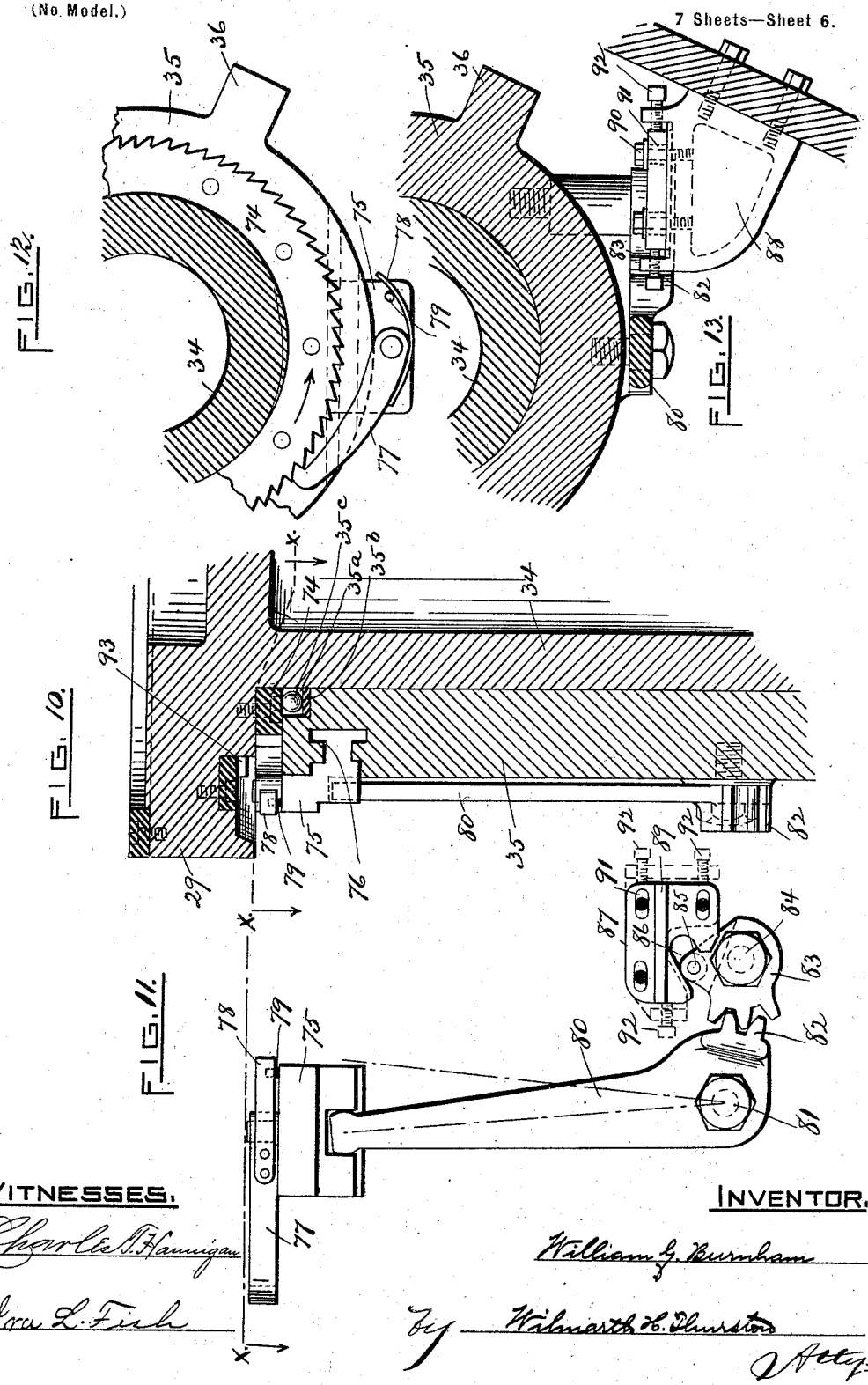

No. 607,982. Patented July 26, 1898.
W. G. BURNHAM.
GEAR CUTTING MACHINE.
(Application filed Apr. 20, 1896.)
(No Model.)
7 Sheets—Sheet 7.
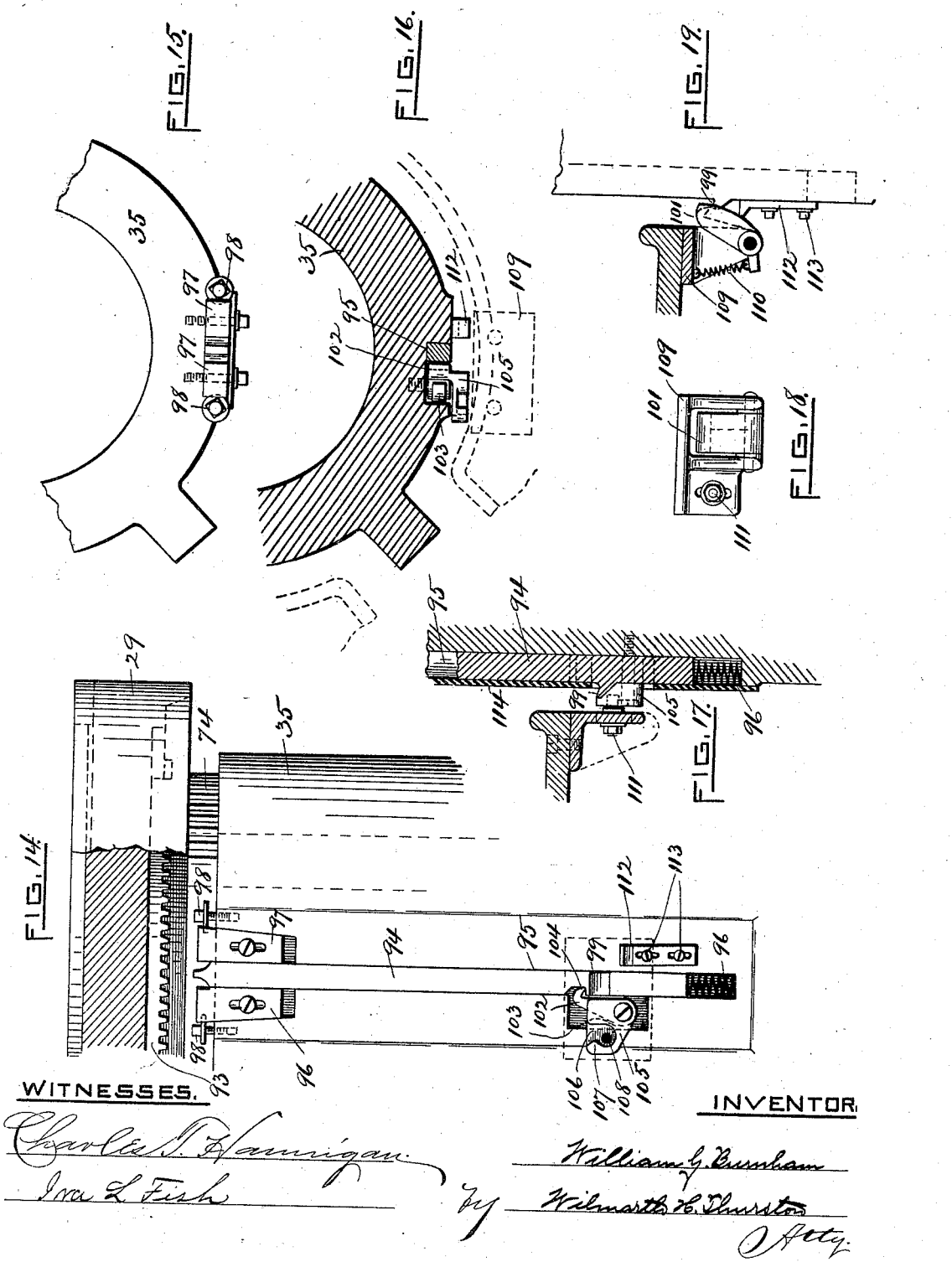
WITNESSES. INVENTOR.

UNITED STATES PATENT OFFICE.

WILLIAM G. BURNHAM, OF PROVIDENCE, RHODE ISLAND, ASSIGNOR TO THE BROWN & SHARPE MANUFACTURING COMPANY, OF SAME PLACE.

GEAR-CUTTING MACHINE.

SPECIFICATION forming part of Letters Patent No. 607,982, dated July 26, 1898.

Application filed April 20, 1896. Serial No. 588,216. (No model.)

*To all whom it may concern:*

Be it known that I, WILLIAM G. BURNHAM, of Providence, county of Providence, State of Rhode Island, have invented certain new and useful Improvements in Gear-Cutting Machines; and I do hereby declare the following specification, taken in connection with the accompanying drawings, forming part of the same, to be a full, clear, and exact description thereof.

The present invention relates to that class of gear-cutting machines in which the gear-blank is secured upon a work-support, which is moved past the cutter to cut the gear, the object being to produce a machine of this class which shall be automatic in action, simple in construction, and efficient and rapid in operation.

The machine illustrated comprises a carriage carrying a rotary work-support and a plurality of cutter-spindles mounted in stationary bearings and each carrying one or more cutters, said cutters being arranged at equal distances about the axis of said support. The carriage is moved forward to carry the work past the cutters and is then quickly returned to its initial position, the work-support being automatically rotated to bring a fresh portion of the gear-blank into position to be acted on by the cutters. The cutters are revolved in opposite directions and so that their inner or active faces move in the direction of the movement of the work, and thus said cutters tend to force the work firmly against the work-support and to feed the work past said cutters. Moreover, by reason of the cutters acting in the direction of the feed they cut from the face of the gear-blank inward toward the base of the gear-teeth, thus avoiding all liability to break or chip off the face of the gear-teeth, as is the case when the cutters act against the feed and therefore from the base of the gear-teeth toward the face of the gear-blank. An additional advantage which arises from this feature in a machine in which the feed is downward is that the chips cut by the cutters drop freely away from the cutters and work and cannot, therefore, interfere in any way with the proper action of the cutters.

A further advantage in arranging the parts so that the work-support moves downwardly past the cutters to cut the blank is that by reason of this arrangement the work-support is above the cutters and freely accessible when the work is to be removed and a new blank inserted. By placing the cutters at equal distances about the work it will be seen that the lateral pressure due to the cutters is balanced, and there is therefore no tendency to displace the work on the work-support, and there is no lateral strain on the carriage, with the result that the movement of the carriage is more smooth and regular and a more perfect cut is produced. By mounting the cutter-spindles in stationary bearings instead of in a moving carriage the cutters are more rigidly supported and the speed of the cutting may be correspondingly increased.

The invention consists in the features and the combinations hereinafter described and claimed.

Referring to the drawings, Figure 1 is a plan view of a machine embodying the present improvements in their preferred form. Fig. 2 is a front elevation. Fig. 3 is a longitudinal vertical section. Fig. 4 is an end elevation. Fig. 5 is a vertical section through the cutter-spindle bearings, and Fig. $5^a$ is a detail view. Fig. 6 is a horizontal section through the feed-regulating shaft. Fig. 7 is a detail view. Figs. 8 and 9 are detail views of the clutch-shifting mechanism. Figs. 10 to 13 are detail views of the indexing mechanism. Figs. 14 to 19 are detail views of the locking mechanism.

A detail description of the machine illustrated will now be given.

Mounted in suitable bearings in the frame is a driving-shaft 1, carrying the driving-pulley 2 and the pinion 3, meshing with and driving a gear 4, fast on the worm-shaft 5, said shaft being mounted in suitable bearings at the side of the frame. Secured to the shaft 5 are the worms 6 and 7, which engage and drive the worm-gears 8 and 9 for rotating the cutters 10, one of said worms being a right-hand worm and the other a left-hand worm, so that the cutters are revolved in opposite directions.

The cutter-heads 11 are mounted on the top of the frame and are adjusted by means of the screw-rods 12, which are mounted to revolve in the blocks 13, secured to the under side of the heads 11, said rods being threaded in the stationary nuts 14, secured to the frame. The cutter-heads 11 are secured in their adjusted position by means of the bolts 15, which pass through slots in the frame and through holes in the cutter-heads and are provided with clamping-nuts 16. By loosening the nuts 16 and turning the rods 12 the cutter-heads may be adjusted forward or backward, as desired. Each of the cutter-heads carries a cutter-spindle, and as the construction of each of these spindles and the manner of mounting the same in the cutter-head are the same only one will be described.

The worm-gear 8 is mounted in a bearing 17 and is provided on its outer face with two ribs or projections 18. The spindle 19 is provided with a flattened head $19^a$, which fits between the ribs 18, and is thus connected with said gear, while being capable of longitudinal movement relative thereto. The spindle passes through the gear 8 and through the bearing 20, where it is surrounded by the sleeve or bushing 21, said sleeve being capable of longitudinal adjustment by the nuts 22, which are threaded upon its ends and bear against the ends of the bearing 20. Beyond the sleeve 21 the spindle is reduced or turned down to form a shoulder 23, against which the cutters 10 are firmly clamped by means of sleeve 24, which is forced against the cutters by the nut 25, threaded on the end of the spindle. Surrounding the sleeve 24 is a sleeve 26, which is adjusted in a similar manner to the sleeve 21 by the nuts 27, which engage the ends of the bearing 28, in which said sleeve is mounted. The sleeves 21 and 26 bear against the faces of the cutters and hold them in position, and by adjusting these sleeves the spindle may be moved longitudinally to adjust the cutters, the sliding connection between the spindle and gear 8 permitting of such adjustment without disconnecting said parts. If it is desired to change the cutters, the nut 25 is removed and the spindle withdrawn longitudinally until its end is flush with the end of sleeve 21, when the cutters may be removed and new ones placed in position, the spindle returned to its normal position, and the nut 25 replaced. One or more cutters may be used on each spindle; but it is preferred to use three, as shown in the drawings.

Located between the cutter-heads 11 is the work-support, which in the form shown consists of a circular table 29, provided with the radial undercut grooves 30, which lead from a central recess 31 and receive the heads of the bolts used for clamping the gear-blank to the support. Secured to the upper face of the table 29 is an annular hardened-steel ring 32, on which the rim of the gear-blank rests. A stud 33 is also secured to the table and serves to center the gear-blank. Depending from the table 29 and preferably made integral therewith is a cylindrical hub 34, which fits within a carriage 35 and is free to revolve therein for a purpose to be described. In the end of the carriage is formed an annular recess $35^a$, in which is fitted a hardened-steel ring $35^b$, and a series of balls $35^c$ run in said recess and support the table 29. The carriage 35 in the form shown consists of a cylinder provided with projecting ribs 36, arranged to slide within the ways or guides 37, secured to the frame by means of bolts 38 and adjusted radially of the cylinder 35 by means of the bolts 39, which pass through the frame and engage the outer faces of the ways 37. The ways 37 are provided with the tapered gibs 40, which may be adjusted by means of the bolts 41, provided with flanges 42, which enter recesses in the sides of said gibs.

The active or cutting faces of the cutters 10 move downward, as shown in Fig. 3, and said cutters in cutting the gear-teeth thus tend to force the carriage 35 downward and feed the blank past the cutters. In order to prevent this action of the cutters from feeding forward the work too rapidly and thus breaking the cutters, means are provided for regulating or controlling the feeding action of the cutters, and the preferred form of such means will now be described.

Secured to the cylinder 35 are the two racks 43, which are engaged by the pinions 44 on the shaft 45. The racks 43 are located directly under the active faces of the cutters and in the line of thrust of the cutters, whereby the work is held more rigidly against said cutters than would otherwise be the case. The shaft 45 is mounted in suitable bearings located in close proximity to the pinions 44, said shaft passing through slots 46, formed in the cylinder 35. Rollers $43^a$, mounted in pivoted bearings $43^b$, are held against the racks 43 by the screws $43^c$ and serve to hold said rack in engagement with the pinions 44. The shaft 45 is rotated to allow the cutters to feed the table downward by means of a worm 47, which engages a worm-gear 48, keyed to said shaft. The worm 47 is secured to the shaft 480, which is driven at the proper speed from the shaft 5 by means of the following mechanism:

Secured to the front end of the shaft 480 is a spur-gear 49, which meshes with a spur-gear 50, secured to a shaft 51, suitably mounted in bearings on the frame. A worm-gear 52 is loosely mounted on the shaft 51 and is driven from the shaft 5 by means of a worm 53, secured to said shaft 5. The hub of the gear 52 is provided with clutch-teeth, which are adapted to be engaged by a clutch 54, which is keyed to the shaft 51, so as to revolve therewith but to be capable of longitudinal movement thereon. When the clutch 54 is in engagement with the hub of gear 52, the shaft 45 is driven from the shaft 5 through the gearing described and the carriage 35 thus allowed to gradually descend under the action of the cutters. After the completion of the downward or feeding movement of the carriage 35 it is necessary that said carriage should be returned to its initial position, and it is desirable that this return movement should be at an increased speed. Any suitable means may be employed for thus quickly returning the carriage, but it is preferred to use for this purpose the same means which controls the feed and to drive this means in a reverse direction and at a higher speed, and in the drawings is shown one way of accomplishing this result.

Loosely mounted on the shaft 480 is a pulley 55, driven from any suitable source of power and carrying one member, 56, of a clutch, the other member, 57, of which is keyed to slide on said shaft. When the clutch members 56 and 57 are in engagement, the clutch 54 is out of engagement and the shaft 480 is driven in a reverse direction and at an increased speed, and thus causes the pinions 44 to return the carriage to its initial position. The clutches may be thrown into and out of engagement by any suitable mechanism, and in the drawings is shown a preferred form of such mechanism. A rod 58 is mounted to slide in suitable bearings at the end of the machine and is connected to clutch 54 by means of the arm 59 and to the clutch member 57 by means of the lever 60, pivoted to the bracket 61, so that when the rod is shifted in either direction one clutch will be thrown into and the other clutch out of engagement. The rod 58 is provided with two contact-shoulders in the form shown, consisting of the two arms 62 63, secured to said rod and adapted to be engaged by the shoulders or projections 64 65 on the spring-plungers 66 67, the rod being forced in one direction by the plunger 66 and in the opposite direction by the plunger 67. Pivoted to a bracket secured to the frame are the two latches or dogs 68 69, which serve to hold the plungers out of action when said plungers are forced back against the tension of their springs. The plungers are forced back against the tension of their springs and the dogs are tripped at the proper time to release the plungers and allow them to quickly shift the rod 51 by means of cams 70 71, mounted on a bushing 72, secured to the end of shaft 45.

The action of the clutch-shifting devices is as follows: When the carriage 35 is at the upper limit of its stroke and about to start downward, the parts are in the position shown in Fig. 4, with the plunger 66 thrust back by the cam 70 and with the latch 68 engaging the projection 64 to hold said plunger retracted, and the projection 73 on cam 71 has tripped the latch 69 and allowed the plunger 65 to force the rod 58 to the left, thereby throwing out the clutch member 57 and throwing in the clutch 54, the shaft 45 being revolved in the direction of the arrow. When the carriage has nearly reached its lowest position, the cam 71 acts to force the plunger 67 back and the catch 69 drops in front of the projection 65 and holds said plunger retracted. As the carriage reaches its lowest position the projection 75 on the cam 70 trips the catch 68, allowing the plunger 66 to shoot forward and suddenly shift the rod 58 to the right and throw out the clutch 54 and throw in the clutch 56 57. The shaft 45 now revolves in the reverse direction under the action of the pulley 55 until the cam 70 again forces back the plunger 66 and the catch 69 is again tripped by the projection 73, when the clutches are again shifted into the position shown in the drawings.

A hand-lever 58$^a$ is pivoted to the frame at 58$^b$ and carries two projecting pins 58$^c$, which are located on opposite sides of a lug 58$^d$, formed on a collar 58$^e$, which collar is secured to rod 58. By means of this lever the rod 58 may be shifted by hand to reverse the movement of the carriage or to move said rod into such a position that neither clutch will be in engagement, and thus stop the carriage.

After each reciprocation of the carriage the table 29 is rotated a certain distance to bring the work into proper position for the cutting of the next tooth or series of teeth, and any suitable means may be employed for this purpose. The means for accomplishing this result illustrated in the drawings will now be described.

Secured to the under side of the table 29 is an annular ring 74, provided with ratchet-teeth. A slide 75 is mounted on ways 76 in the carriage, and pivoted to said slide is a pawl 77, held in engagement with the ratchet 74 by the spring 78, which is secured to said pawl and bears against a pin 79 on the slide 75. One arm of a bell-crank lever 80, pivoted to the carriage 35 at 81, engages the slide 75, and the other arm of said lever is provided with gear-teeth 82, which are engaged by a segment 83, pivoted at 84 to the carriage. The segment 83 carries a bowl 85, which is engaged by a cam-groove 86, formed in a plate 87, adjustably mounted on a bracket 88, secured to the frame. A rib 89, formed on the plate 87, fits in a groove in a bracket 88, and said plate is secured to said bracket by means of bolts 90, which pass through slots 91 in said plate and is adjusted by means of the bolts 92, passing through lugs in said bracket and engaging the sides of said plate.

Any suitable means may be employed for locking the table 29 to the carriage, but it is preferred to use the means shown, which is as follows: An annular notched ring 93 is secured to the under side of the table 29 and is adapted to be engaged by a bolt 94, mounted in the carriage 35. The bolt 94 slides in a groove 95 in the side of the carriage and is pressed upward by the spring 96, interposed between the end of the groove and the bolt. Tapered gibs 97 are mounted on each side of the bolt 94 and are adjusted by means of the flanged bolts 98 to take up the wear. The bolt 94 is provided with the lug or shoulder 99, which on the upward stroke of the carriage is engaged by a hook 101, pivoted in a bracket 109, secured on the frame, thereby drawing said bolt out of the notch in the ring 93. The hook 101 is pressed toward the bolt 94 by means of the spring 110. The bolt 94 is held withdrawn by means of a pivoted latch or hook 102, which is pressed toward said bolt by the spring 103, and when said bolt is withdrawn engages a notch or recess 104 in said bolt. The latch 102 is provided with a laterally-projecting plate 105, in which is formed a recess or groove 106, having a projection 107 on its side, which as the carriage moves downward engages a pin 108 on the frame, and thus moves the catch to release the bolt 94. The pin 108 is adjustably mounted in a slot in the bracket 109 and held in place by a nut 111. A lug or projection 112 is adjustably secured to the carriage 35 by means of the bolts 113 and is arranged to engage the hook 101 and force said hook back out of engagement with the shoulder 99 as the catch 102 engages the notch 104. A plate 114 is secured to the carriage 35 and serves to hold the bolt 94 in the groove 95, said plate being cut away to allow the proper action of the parts above described. (See Figs. 2 and 17.)

The operation of the indexing and locking mechanism is as follows: As the carriage approaches the limit of its upward movement and after the gear-blank has cleared the cutters the bowl 85 engages the cam-groove 86, and the pawl 77 is moved to the left in Figs. 11 and 12, the spring 78 allowing said pawl to move over the teeth of the ratchet 74. At about the same time the hook 101 engages the shoulder 99 and withdraws the bolt 94, which is held withdrawn by the catch 102 engaging the notch 104. As the catch 102 engages the notch 104 the hook 101 is moved out of engagement with the shoulder 99 by means of the lug 112, so that the bolt 94 is unaffected by said hook as the carriage finishes its upward movement. The swinging of said catch 102 into said notch brings the projection 106 above the pin 108, as shown in Fig. 14. As the carriage starts downward the bowl 85 passes out of cam 86, thus moving the pawl 77 toward the right in Figs. 11 and 12 and rotating the table 29 the proper distance. As the bowl 85 leaves the cam 86 and the forward rotation of the table 29 is completed the projection 107 strikes the pin 108, and the catch 102 is swung out of the notch 104, allowing the bolt 94 to engage a notch in the plate 93 and lock the table 29 to the carriage.

The operation of the machine is obvious from the above description and is as follows: The gear-blank having been secured upon the table 29, the power is turned on, and the carriage 35 is gradually lowered by the rotation of the shaft 45 in the direction of the arrows to carry said blank past the cutters. The carriage is then quickly returned to its initial position in the manner above described and the operation repeated, the indexing of the work being performed automatically while the gear-blank is above and clear of the cutters, as previously described.

What I claim as my invention, and desire to secure by Letters Patent, is—

1. In a gear-cutting machine, the combination with guides, of a work-support arranged to move on said guides by gravity, one or more cutters, means for revolving said cutters in the direction of the feed of the work, and means regulating the movement of the work-support under the action of gravity and said cutters, substantially as described.

2. In a gear-cutting machine, the combination with guides, of a work-support arranged to move on said guides by gravity, a plurality of cutters arranged at equal distances about said support, means for revolving the active faces of said cutters in the direction of the feed of the work, and means for regulating the movement of the table under the action of said cutters and gravity, substantially as described.

3. In a gear-cutting machine, the combination of a work-support, a plurality of cutters arranged about said support, means for revolving the active faces of said cutters, in the direction of the feed of the work, means for regulating the feeding action of the cutters, and means for automatically indexing the work, substantially as described.

4. In a gear-cutting machine, the combination of a vertically-movable work-support, a cutter, means for revolving the active face of said cutter downwardly, and means for regulating the feeding action of said cutter, substantially as described.

5. In a gear-cutting machine, the combination of a vertically-movable work-support, a plurality of cutters arranged about said work-support, means for revolving the active faces of said cutters downwardly and means for regulating the feeding action of the cutters, substantially as described.

6. In a gear-cutting machine, the combination of a vertically-movable work-support, a plurality of cutters arranged at equal distances about said support, means for revolving the active faces of said cutters downwardly and means for regulating the feeding action of said cutters, substantially as described.

7. In a gear-cutting machine, the combination of a work-support, a plurality of cutters arranged about said support, means for revolving the active faces of said cutters in the direction of the feed of the work, means for regulating the feeding action of the cutters, and means for driving said regulating means in a reverse direction and at an increased speed, substantially as described.

8. In a gear-cutting machine, the combination of a work-support, a cutter, means for revolving the active face of said cutter in the direction of the feed of the work, means located in the line of thrust of said cutter for regulating the feeding action of said cutter, substantially as described.

9. In a gear-cutting machine, the combination of a vertically-moving carriage carrying a work-support, a cutter, means for revolving the active face of said cutter downwardly, a rack secured to said carriage, a pinion engaging said rack, and means for revolving said pinion, substantially as described.

10. In a gear-cutting machine, the combination of a work-support, a plurality of cutters arranged about said support, means for revolving the active faces of said cutters in the direction of the feed of the work, a plurality of devices for regulating the feeding action of the cutters said devices being located in the lines of thrust of said cutters, substantially as described.

11. The combination of a clutch-shifter, a spring-plunger for engaging said shifter, a catch for holding said plunger retracted, and cams for retracting said plunger and releasing said catch, substantially as described.

12. The combination of a clutch-shifter, oppositely-arranged spring-plungers engaging said shifter, catches for holding said plungers retracted, and cams for retracting said plungers and releasing said catches, substantially as described.

13. The combination of a clutch-shifter, two arms projecting from said shifter, two oppositely-arranged spring-plungers for engaging said arms, catches for holding said plungers retracted, and cams for retracting said plungers and releasing said catches, substantially as described.

14. In a gear-cutting machine, the combination of a cutter-spindle having a reduced portion forming a shoulder, means for clamping the cutters against said shoulder, a gear, and a coupling for detachably connecting said gear and spindle, substantially as described.

15. In a gear-cutting machine, the combination of a gear provided with projections, a cutter-spindle engaged by said projections, a reduced portion on said spindle forming a shoulder, a sleeve surrounding said reduced portion, and means for forcing said sleeve against the cutters to clamp said cutters against said shoulder, substantially as described.

16. In a gear-cutting machine, the combination of a gear, a cutter-spindle having a sliding connection with said gear, bearings for said spindle, and adjustable sleeves in said bearings for engaging the cutters, whereby the cutter-spindle may be adjusted longitudinally without disconnecting it from said gear, substantially as described.

17. In a gear-cutting machine, the combination of a cutter-spindle, bearings for said spindle, and adjustable sleeves in said bearings for engaging the opposite faces of the cutters, substantially as described.

18. In a gear-cutting machine, the combination of a reciprocating carriage carrying a work-support, a ratchet on said work-support, a pawl-carrier mounted on said carriage, a pawl on said carrier a lever engaging said pawl-carrier, a segment for operating said lever, and a stationary cam for operating said segment, substantially as described.

19. In a gear-cutting machine, the combination of a reciprocating carriage, a work-support mounted to revolve thereon, means for intermittently revolving said support, a locking-bolt, an abutment for engaging and withdrawing said bolt, to allow the revolution of said work-support, substantially as described.

20. In a gear-cutting machine, the combination of a reciprocating carriage, a rotary work-support mounted on said carriage a locking-bolt, means for drawing said bolt, a catch for holding said bolt withdrawn, and means for releasing said catch, substantially as described.

21. In a gear-cutting machine, the combination of a reciprocating carriage, a rotary work-support mounted on said carriage a locking-bolt, an abutment for withdrawing said bolt, a catch for holding said bolt withdrawn, and means for releasing said catch, substantially as described.

WILLIAM G. BURNHAM.

Witnesses:
W. H. THURSTON,
IRA L. FISH.